UNITED STATES PATENT OFFICE.

MARK E. PUTNAM AND WILLIAM E. KIRST, OF MIDLAND, MICHIGAN, ASSIGNORS TO THE DOW CHEMICAL COMPANY, OF MIDLAND, MICHIGAN, A CORPORATION OF MICHIGAN.

CELLULOSE-ACETATE SOLUTION.

1,406,224. Specification of Letters Patent. Patented Feb. 14, 1922.

No Drawing. Application filed December 11, 1918. Serial No. 266,190.

*To all whom it may concern:*

Be it known that we, MARK E. PUTNAM and WILLIAM E. KIRST, citizens of the United States, and residents of Midland, county of Midland, and State of Michigan, have jointly invented a new and useful Improvement in Cellulose-Acetate Solutions, of which the following is a specification, the principle of the invention being herein explained and the best mode in which we have contemplated applying that principle, so as to distinguish it from other inventions.

The discovery of a suitable solvent medium for cellulose acetate has presented no small problem, the difficulty being partly due of course to variations in the constitution of the acetate, which has never been definitely established. Among substances which have been suggested for use as a solvent in the connection stated is glycol (or ethylene) chlorhydrin ($CH_2ClCH_2OH$), which indeed will readily dissolve the cellulose acetate but forms therewith a mixture that is so extremely slow drying that no successful commercial product, so far as known, has even been obtained. The present invention is based on the discovery that by the admixture of certain other bodies the drying of the solution of cellulose acetate will be measureably quickened without affecting the ease with which such acetate is dissolved in the first place.

To the accomplishment of the object thus indicated, the invention then consists of the ingredients hereafter fully described and particularly pointed out in the claims, the following description setting forth merely certain of the various combinations of ingredients or formulas which may be employed, all within the scope of the invention.

The cellulose acetate employed is preferably the form which is insoluble in acetone, this being generally recognized as best suited for the production of lacquers, varnishes, photographic films and like flexible or plastic articles. In preparing the compounds or mixtures of present interest a quantity of solvent mixture is first formed, this consisting of a chlorhydrin, an alcoholic body and an aromatic hydrocarbon. Preferably we employ ethylene chlorhydrin, ($CH_2Cl.CH_2.OH$), which is also known as glycol chlorhydrin, but propylene (or isopropyl) chlorhydrin ($CH_3.CHCl.CH_2OH$), or a mixture of said two chlorhydrins is satisfactory for the purpose in hand. Both of these chlorhydrins, it will be observed, are derivatives of the olefine series ($C_nH_{2n}$) of hydrocarbons; in other words, they are the hydrochloric esters of ethylene glycol and propylene glycol, respectively. The alcoholic body is preferably ethyl alcohol but methyl alcohol may be used, and acetone as well as methyl or ethyl acetate, all of which will serve as satisfactory substitutes for the alcohol proper, are to be understood as being equivalents for the purpose in hand. The aromatic hydrocarbon employed is preferably benzol, but its homologues may be used in its stead if preferred.

The proportion in which the several preferred ingredients, as above indicated, will be employed is as follows, viz: five to twenty-five parts chlorhydrin, fifteen to forty-five parts alcohol and sixty to twenty-five parts of benzol, all by weight, it being understood that amount of benzol varies in inverse proportion to the amount of the other ingredients, particularly the chlorhydrin. To the solvent mixture thus provided the cellulose acetate is then added with stirring, the proportion of the latter to the former depending on the character of the product desired. One part of acetate to ten of the solvent mixture will give a clear limpid solution, which may be readily poured or applied with a brush and which, upon exposure to the air at normal temperatures, will dry promptly, leaving a transparent film that will remain flexible indefinitely. Where the compound is utilized as a coating material, i. e., as a varnish or lacquer, any desired color may be imparted to the coating by mixing in a suitable pigment or dye, as will be readily understood. The use of a larger proportion of acetate will give a correspondingly more viscous mixture.

While specific reference has been made to cellulose acetate, or acetyl cellulose as it is also called, it will be understood that the herein described solvent may also be used with other cellulose esters of fatty acids, e. g., cellulose formate. It will also be understood that the quantity ratios between the cellulose ester and the specified ingredients of such solvent compound may be varied to suit the degree of fluidity or plasticity, as the case may be, desired in the product.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. A new composition of matter, consisting of a solution of cellulose acetate in chlorhydrin admixed with an alcoholic body and an aromatic hydrocarbon, the amount of each of the first two admixed ingredients being relatively small compared with that of the last.

2. A new composition of matter, consisting of a solution of cellulose acetate in ethylene chlorhydrin admixed with an alcoholic body and benzol, the amount of each of the first two admixed ingredients being relatively small compared with that of the last.

3. A new composition of matter, consisting of a solution of cellulose acetate in ethylene chlorhydrin admixed with alcohol and benzol, the amount of each of the first two of said admixed ingredients being relatively small compared with that of the last.

4. A new composition of matter, consisting of a solution of cellulose acetate in ethylene chlorhydrin admixed with alcohol and benzol, the proportions of the solvent mixture being approximately five to twenty five parts of chlorhydrin, fifteen to twenty five parts of alcohol and sixty to twenty five parts of benzol.

5. A solvent for cellulose acetate, consisting of a mixture of ethylene chlorhydrin, alcohol and benzol, the proportions being approximately five to twenty five parts of chlorhydrin, fifteen to twenty five parts of alcohol and from sixty to twenty five parts of benzol.

6. A solvent for cellulose acetate consisting of ethylene chlorhydrin, an alcoholic body and an aromatic hydrocarbon, the amount of each of the first two ingredients being relatively small compared with that of the last.

7. A solvent for cellulose acetate consisting of a mixture of ethylene chlorhydrin, alcohol and benzol, the amount of each of the first two ingredients being relatively small compared with that of the last.

Signed by us, this 6th day of December, 1918.

MARK E. PUTNAM.
WILLIAM E. KIRST.